(12) United States Patent
Stefani et al.

(10) Patent No.: US 10,478,995 B2
(45) Date of Patent: Nov. 19, 2019

(54) PRESSING DEVICE

(71) Applicant: SYSTEM S.P.A., Fiorano Modenese (Modena) (IT)

(72) Inventors: Franco Stefani, Sassuolo (IT); Franco Gozzi, Formigine (IT)

(73) Assignee: SYSTEM S.P.A., Fiorano Modenese (IT)

( * ) Notice: Subject to any disclaimer, the term of this patent is extended or adjusted under 35 U.S.C. 154(b) by 0 days.

(21) Appl. No.: 16/075,788

(22) PCT Filed: Mar. 2, 2017

(86) PCT No.: PCT/IB2017/051213
§ 371 (c)(1),
(2) Date: Aug. 6, 2018

(87) PCT Pub. No.: WO2017/149484
PCT Pub. Date: Sep. 8, 2017

(65) Prior Publication Data
US 2019/0061197 A1   Feb. 28, 2019

(30) Foreign Application Priority Data
Mar. 4, 2016   (IT) .................. 102016000022906

(51) Int. Cl.
*B28B 5/02* (2006.01)
*B28B 3/02* (2006.01)
(Continued)

(52) U.S. Cl.
CPC .............. *B28B 3/024* (2013.01); *B28B 5/021* (2013.01); *B28B 5/027* (2013.01); *B29C 43/228* (2013.01); *B29C 2043/483* (2013.01)

(58) Field of Classification Search
CPC ......... B28B 5/021; B28B 5/025; B28B 5/027; B28B 3/024; B30B 5/06; B29C 43/228; B29C 2043/483
See application file for complete search history.

(56) References Cited

U.S. PATENT DOCUMENTS 3,992,135 A   11/1976   Camp, III
4,025,272 A   5/1977   Camp, III
(Continued)

FOREIGN PATENT DOCUMENTS

DE   8711469 U1   11/1987
DE   19847814 A1   4/2000
(Continued)

*Primary Examiner* — James P Mackey
(74) *Attorney, Agent, or Firm* — Pearne & Gordon LLP

(57) ABSTRACT

A pressing device, comprising: a lower presser (10), provided with a pressing surface (10*a*) facing upwards; an upper presser (11), provided with a pressing surface (11*a*), facing downwards; at least one of the two pressers is movable towards and away relative to the other in order to perform pressing of a layer (L) of a ceramic material; a pressing space (V) delimited inferiorly and superiorly by the lower presser (10) and by the upper presser (11); a lower belt (2), movable along a forward direction (Y) and comprising an active portion (3) arranged at least partially between the upper presser (11) and the lower presser (10); an upper belt (4), movable along the forward direction (Y) and comprising an active portion (5) arranged at least partially between the lower belt (2) and the upper presser (11); two side barriers (13,14,15), arranged to laterally contain the layer (L) within the pressing space (V).

11 Claims, 6 Drawing Sheets

(51) Int. Cl.
 *B29C 43/22* (2006.01)
 *B29C 43/48* (2006.01)

(56) References Cited

U.S. PATENT DOCUMENTS

| | | | |
|---|---|---|---|
| 4,573,404 A * | 3/1986 | Held | ......................... B30B 5/04 |
| | | | 100/151 |
| 4,714,015 A * | 12/1987 | Stabler | .................... B30B 5/062 |
| | | | 100/154 |
| 4,885,088 A | 12/1989 | Sbaschnigg | |
| 5,460,764 A | 10/1995 | Held | |
| 5,827,460 A | 10/1998 | Brentrup et al. | |
| 6,464,914 B1 | 10/2002 | Graf | |
| 7,210,919 B2 | 5/2007 | Senosiain | |
| 2005/0214401 A1 | 9/2005 | Senosiain | |

FOREIGN PATENT DOCUMENTS

| | | |
|---|---|---|
| EP | 0484735 A1 | 5/1992 |
| EP | 0544645 A2 | 6/1993 |
| EP | 1136211 A1 | 9/2001 |
| EP | 1454726 A1 | 9/2004 |
| EP | 1500480 A2 | 1/2005 |
| EP | 1669177 A2 | 6/2006 |
| FR | 2591911 A1 | 6/1987 |
| WO | 0121399 A1 | 3/2001 |

* cited by examiner

PRESSING DEVICE

FIELD OF THE INVENTION

The present invention relates to a pressing device for ceramic items.

DESCRIPTION OF RELATED ART

In particular, the invention relates to a device for pressing ceramic items, designed by the same applicant and known in the sector by publication EP1500480, in which the powder material to be pressed is arranged in the form of a layer on a bearing plane constituted by the upper face of a continuous conveyor belt which is supported slidably on a lower presser. The pressing is carried out with an upper presser by means of interposing a continuous loop-wound belt, the external surface whereof is facing towards the continuous conveyor belt.

In the devices currently available it may happen, especially in the presence of thick layers (for example over 30 mm thick), that particles of powder and/or parts of the layer escape from the pressing space, falling to the sides of the continuous conveyor belt. Such an event is absolutely undesirable, since various movable parts of the press are arranged below the continuous conveyor belt, in particular the hydraulic actuator members of the lower piston. Any deposits of ceramic powder could therefore ruin couplings and mechanisms, and comprise the seal of the lower piston.

The aim of the present invention is to overcome the drawbacks of the currently available pressing devices.

In particular, the device according to the present invention offers the important advantage of preventing ceramic powders falling and/or being deposited outside the pressing space.

BRIEF DESCRIPTION OF THE DRAWINGS

Further characteristics and advantages of the present invention will become more apparent in the following detailed description of an embodiment of the present invention, illustrated by way of non-limiting example in the attached figures, in which.

DETAILED DESCRIPTION OF PREFERRED EMBODIMENTS OF THE INVENTION

Figure 1:
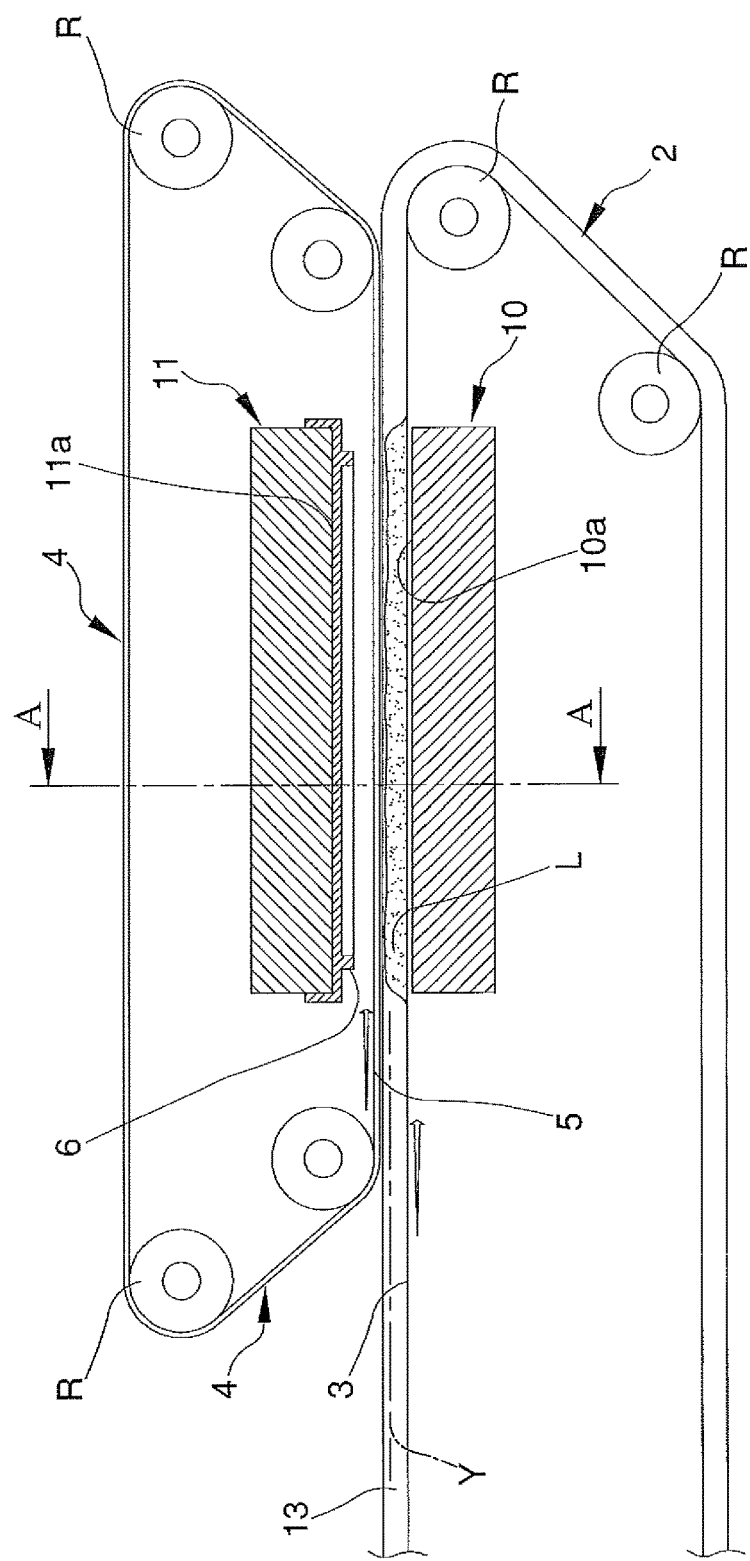
FIG. 1 shows a schematic view of the pressing device, shown in a partial section on a vertical plane.
Figure 1A:
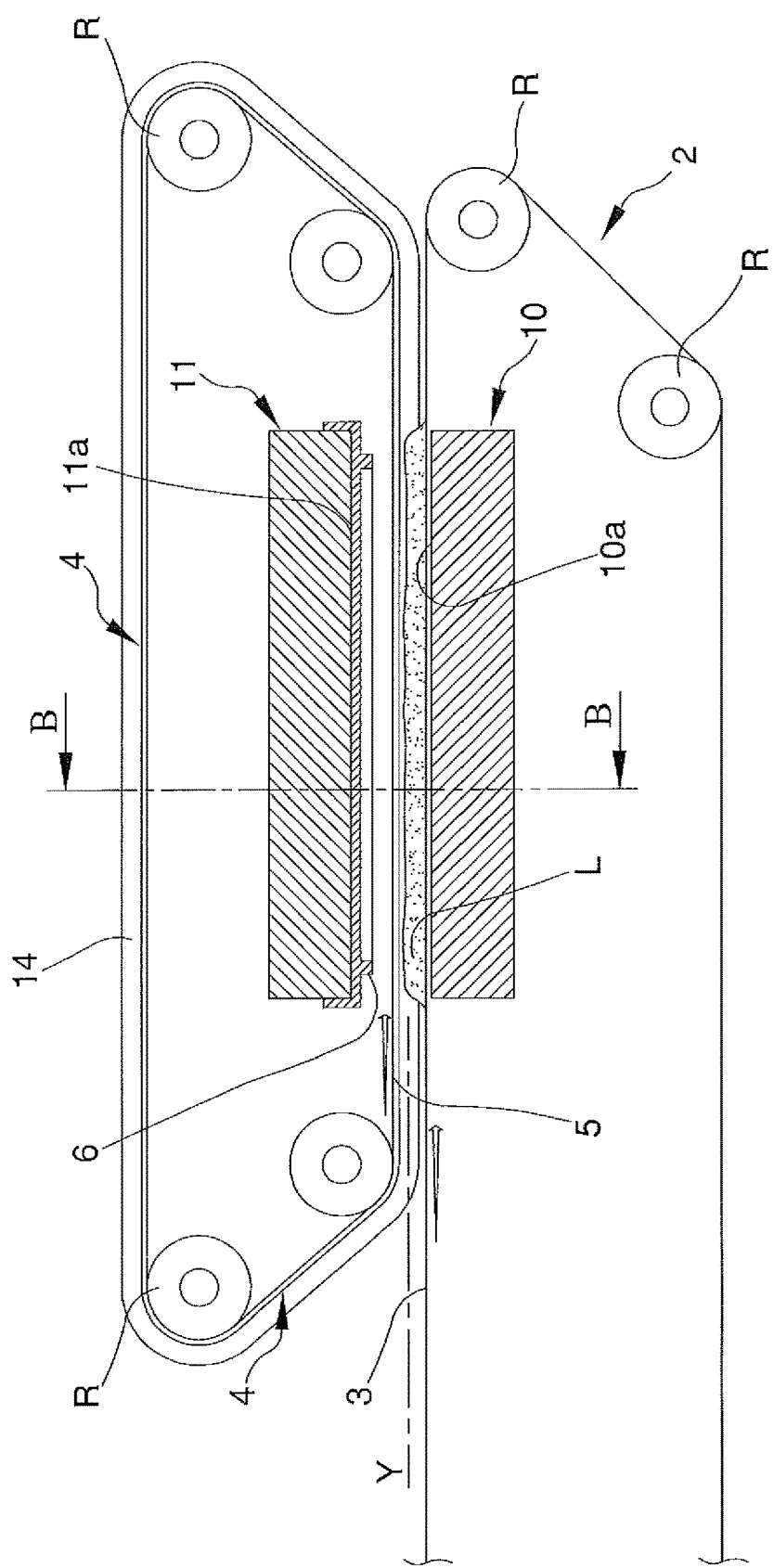
FIG. 1a shows a schematic view of an alternative embodiment of the pressing device, shown in a partial section on a vertical plane.
Figure 1B:
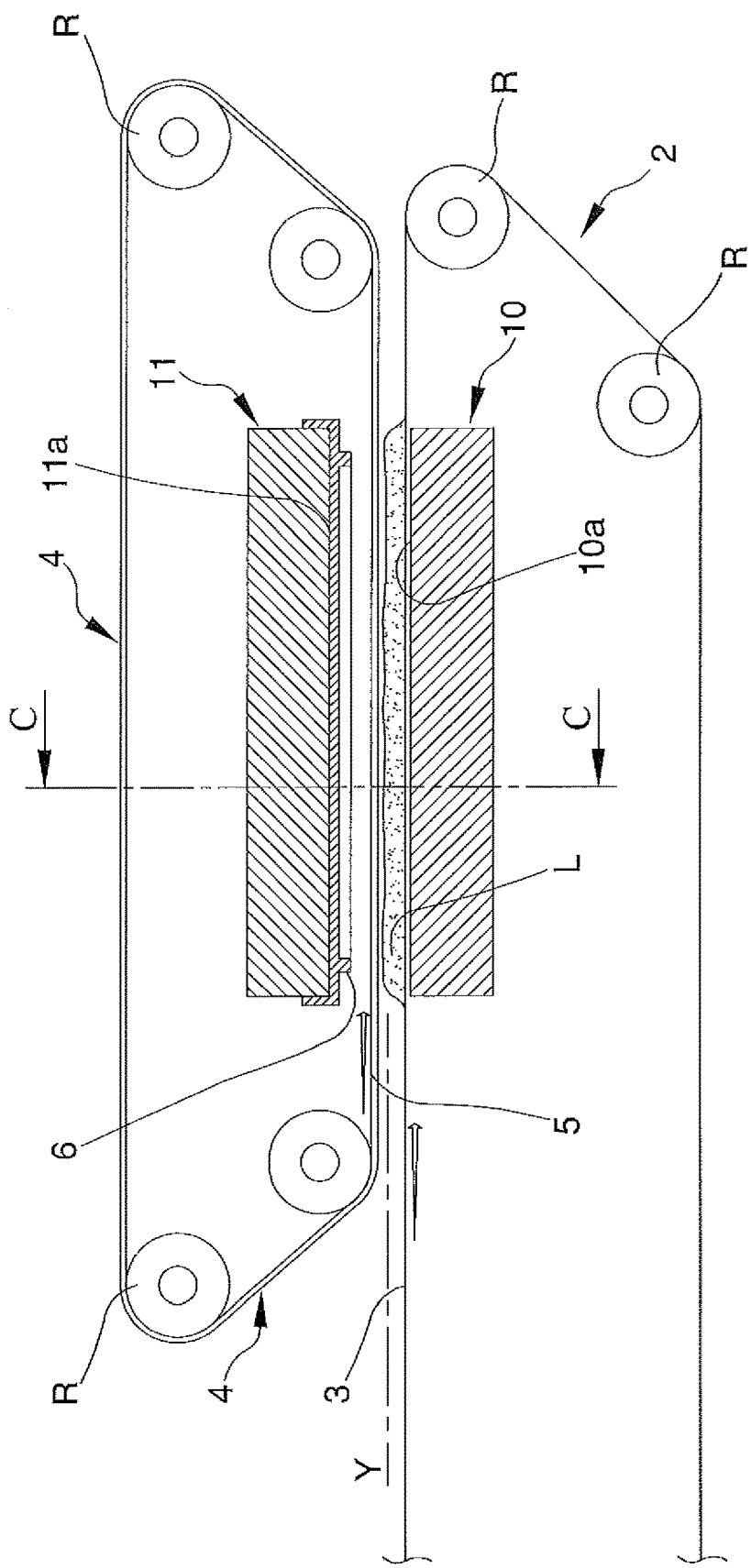
FIG. 1b shows a schematic view of a further embodiment of the pressing device, shown in a partial section on a vertical plane.

The pressing device of the present invention comprises a lower presser (10), provided with a pressing surface (10a) facing upwards, and an upper presser (11) provided with a pressing surface (11a) facing downwards. The two pressers are part of a press, not illustrated in detail, by which press they are activated to reciprocally near and distance so as to carry out the pressing of a deposited load (L) in the form of a layer of ceramic material. The upper presser (11) may be provided inferiorly with a forming element (6), applied to its pressing surface (11a), which is structured to delimit an outline on the load (L) along which the material is more greatly compacted. The presence of the forming element (6) is not however essential.

The device further comprises a lower belt (2), which has an active portion (3) provided with a bearing surface facing upwards. The active portion (3) is at least partially arranged between the upper presser (11) and the lower presser (10). The lower belt (2) is thus arranged with the active portion (3) thereof above the lower presser (10) and below the upper presser (11). The active portion (3) of the lower belt (2) is movable along an advancement direction (Y) for feeding the layers (L) of material to be pressed into the space comprised between the two pressers (10,11). The loads (L) to be pressed are deposited on the lower belt (2) upstream of the two pressers, using known means to the person skilled in the art and not illustrated in detail. The lower belt (2) is activated by means of rollers (R) arranged in relation to the pathway to be followed, in a known way in the art. Such rollers have been only schematically represented in FIG. 1.

The pressing device preferably comprises an upper belt (4) provided with an active portion (5) arranged at least partially between the lower belt (2) and the upper presser (11). The active portion (5) of the upper belt (4) is movable along the advancement direction (Y) in accordance with the active portion (3) of the lower belt (2). At least for a portion arranged at the pressers (10,11), and partially upstream and downstream thereof, the two active portions (3,5) are both parallel to the advancement direction (Y). The upper belt (4) is also activated by means of rollers (R) arranged in relation to the pathway to be followed, in a known way in the art. The rollers have been only schematically represented in the figures.

During the feeding of a load (L) to the press (10,11), the movable belts (2,4) preferably move at the same speed. The alignment and synchrony between the movable belts (2,4) can be obtained in a known way via a retroactive control. During this step the pressers (10,11) are separated by a greater distance to allow inlet of the load (L) into the space comprised between the pressers. In this configuration the active portions (3,5) are parallel to one another and are separated by a distance which enables the inlet of the load (L), the thickness of which, i.e. the height measured perpendicularly to the bearing surface of the lower active portion (3), is smaller than the distance separating the active portions (3,5).

The lower presser (10) and the upper presser (11) delimit overall a pressing space (V) within which the pressing of the load (L) takes place.

To prevent particles or parts of the load (L) escaping from the pressing space (V), deposited in undesired areas, the pressing device comprises side barriers (13,14,15), which are so arranged as to laterally contain the layer (L) within the pressing space (V). Such side barriers (13,14,15) do not interfere with the movement of the pressers (10,11), i.e. they do not influence the pressing of the load (L), and maintain the load (L) within the pressing space (V). In particular, the side barriers (13,14,15) prevent particles or parts of the load (L) escaping to the side of the lower belt (2). Preferably, the side barriers (13,14,15) are located within the operating area of the pressers (10,11), meaning the area inside which the pressers are able to exert pressure. In this way, the side barriers are compressed together with the layer (L), i.e. they perform their containment function throughout the entire pressing cycle.

Figure 2:
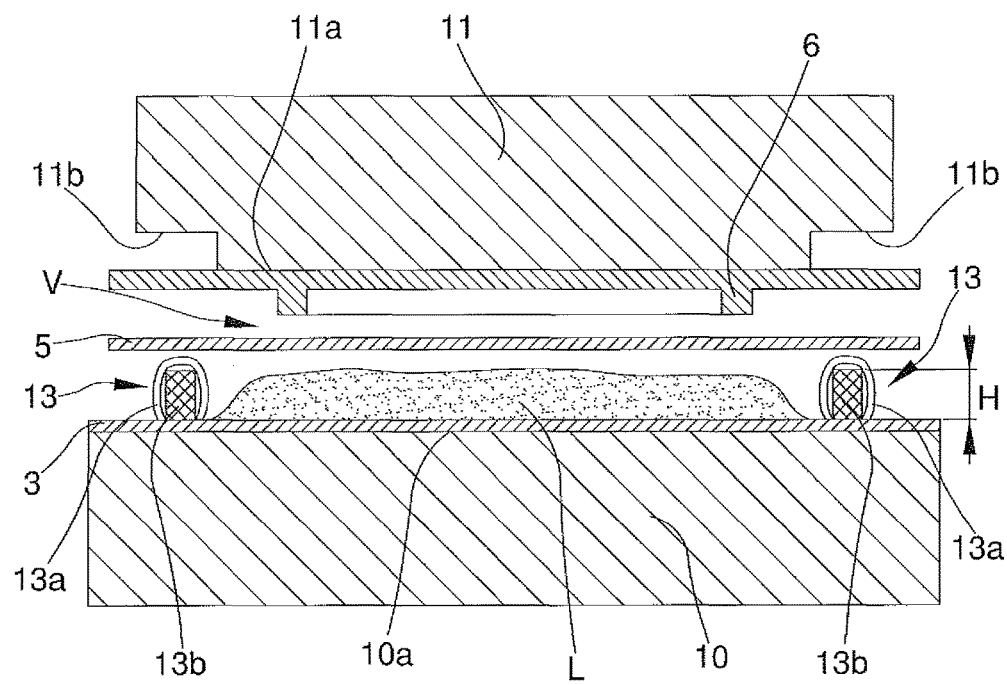
FIGS. 2 and 3 show a view of the device of FIG. 1, shown in a partial section on the plane of trace A-A of FIG. 1 in two operating configurations.
Figure 3:
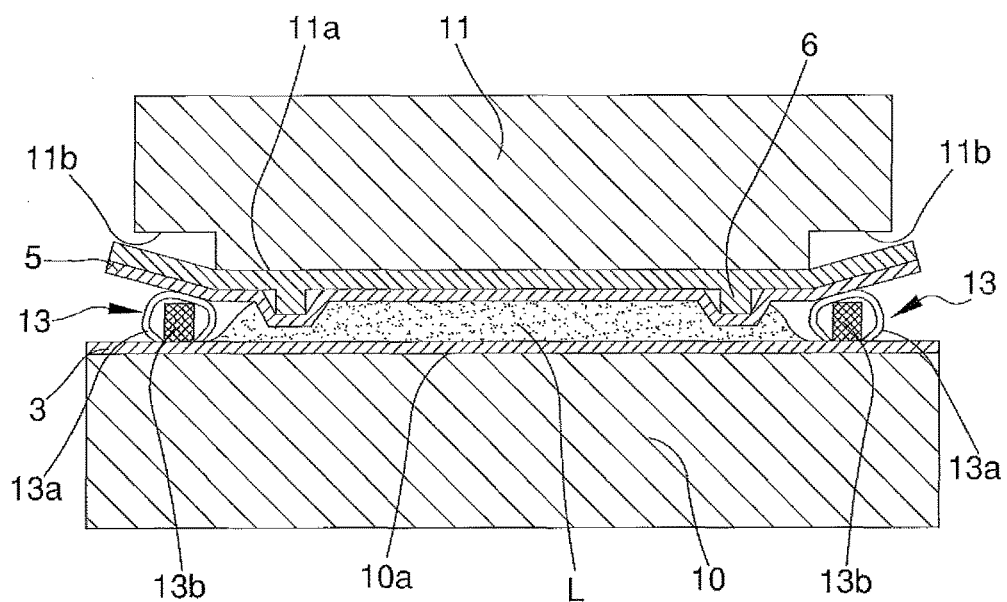

In a first embodiment, illustrated in FIGS. 2 and 3, the side barriers (13,14,15) comprise a pair of lower elements (13), solidly constrained to the lower belt (2) and overall oriented in a direction parallel to the forward direction (Y). In the active portion (3) of the lower belt (2), the lower elements (13) project upwards, to the sides of the pressing space (V). The lower elements (13) may be arranged for example in side areas of the lower belt (2).

In a possible embodiment (not shown), the lower belt (2) may be formed by two or more distinct lengths, joined to one another to form a single belt. In that case the lower elements (13) could be interrupted in the area of the joins between the different lengths. The motion of the lower belt (2) and the depositing of the loads (L) may be handled in such a way that the loads (L) are subsequently deposited at the portions in which the lower elements (13) are present.

In the embodiment represented, the lower elements (13) comprise an envelope (13a), which is associated with the lower belt (2) and an inner body (13b) contained within the envelope (13a). The envelope (13a) is preferably made of flexible material. The inner body (13b) is preferably removable from the envelope (13a). This enables inner bodies to be used with different characteristics and thicknesses in relation for example to the thickness of the load (L) to be pressed. As the thickness of the load (L) to be pressed increases, it is possible to use an inner body (13b) with a greater thickness (H), where thickness means the height of the inner body (13b) with respect to the surface area of the lower belt (2).

During the pressing step, the lower elements (13) are compressed between the pressers, becoming elastically deformed as shown in FIG. 3. To limit the pressure exerted on the lower elements, two stacks (11b) may be provided. Such stacks (11b) are preferably arranged on the pressing surface (11a) of the upper presser (11). The stacks (11b) are substantially conformed in the form of recesses and are aligned on a vertical plane with a respective lower element (13).

Figure 4:
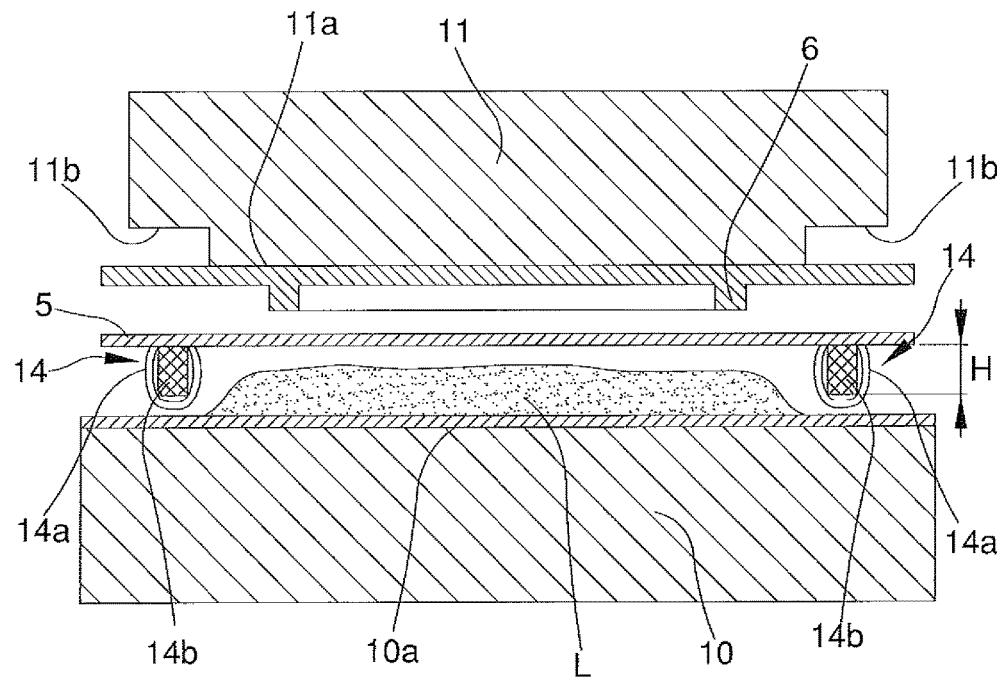
FIGS. 4 and 5 show an alternative embodiment of the device according to the present invention, shown in a partial section on the plane of trace B-B of FIG. 1a in two operating configurations.
Figure 5:
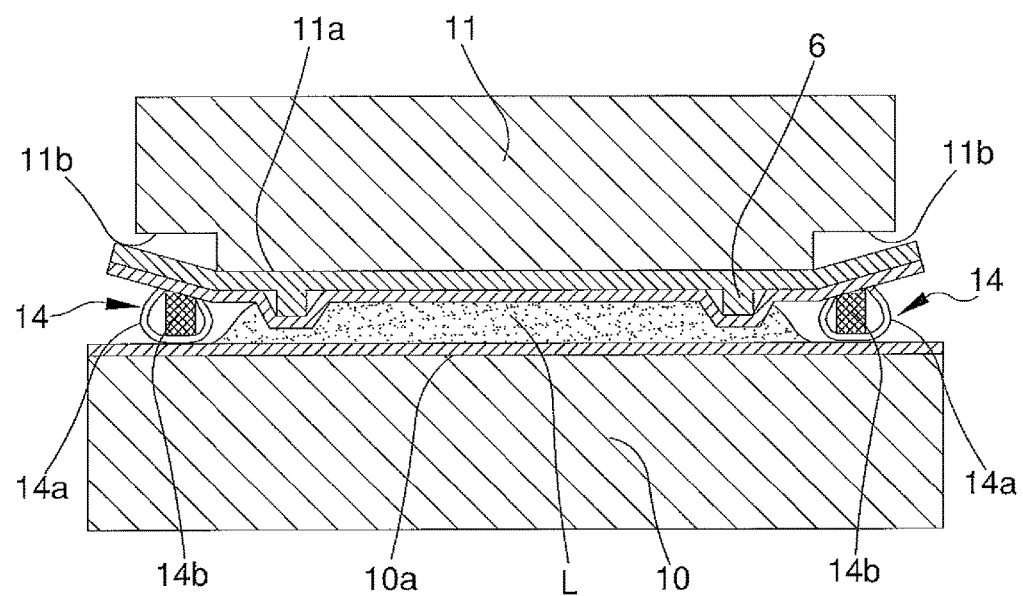

In a further possible embodiment, illustrated in FIGS. 4 and 5, the side barriers (13,14,15) comprise a pair of upper elements (14), solidly constrained to the upper belt (4) and overall oriented in a direction parallel to the forward direction (Y). Along the active portion (5) of the upper belt (4), the upper elements (14) project downwards to the sides of the pressing space (V). The upper elements (14) may be arranged for example in side areas of the upper belt (4).

In a possible embodiment (not shown), the upper belt (4) may be formed by two or more distinct lengths, joined to one another to form a single belt. In that case the upper elements (14) could be interrupted in the area of the joins between the different lengths. The motion of the upper belt (4) and the depositing of the loads (L) on the lower belt (2) may be handled in such a way that the loads (L) are located in the pressing space (V) simultaneously to the upper elements (14).

In a possible embodiment, illustrated in FIGS. 4 and 5, the upper elements (14) comprise an envelope (14a) solidly constrained to the upper presser (11), and an inner body (14b), contained within the envelope (14a). In the same way as for the lower elements (13) described above, the envelope (14a) is made of flexible material. The inner body (14b) is preferably removable from the envelope (14a). This enables inner bodies to be used with different characteristics and thicknesses in relation for example to the thickness of the load (L) to be pressed. As the thickness of the load (L) to be pressed increases, it is possible to use an inner body (14b) with a greater thickness (H), where thickness means the height of the inner body (14b) with respect to the surface area of the upper belt (4).

Figure 6:
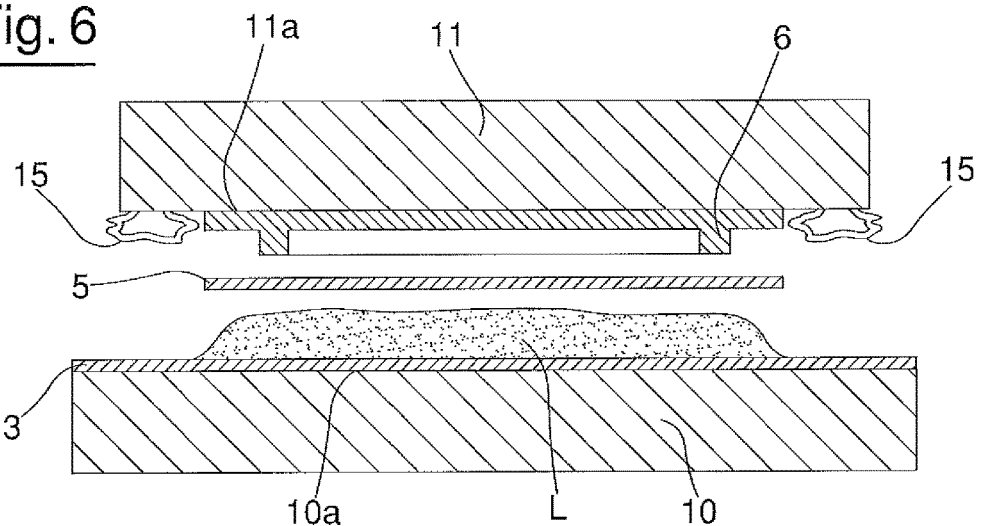
FIGS. 6, 7 and 8 show a further embodiment of the pressing device according to the present invention, shown in partial section on the plane of trace C-C of FIG. 1b.
Figure 7:
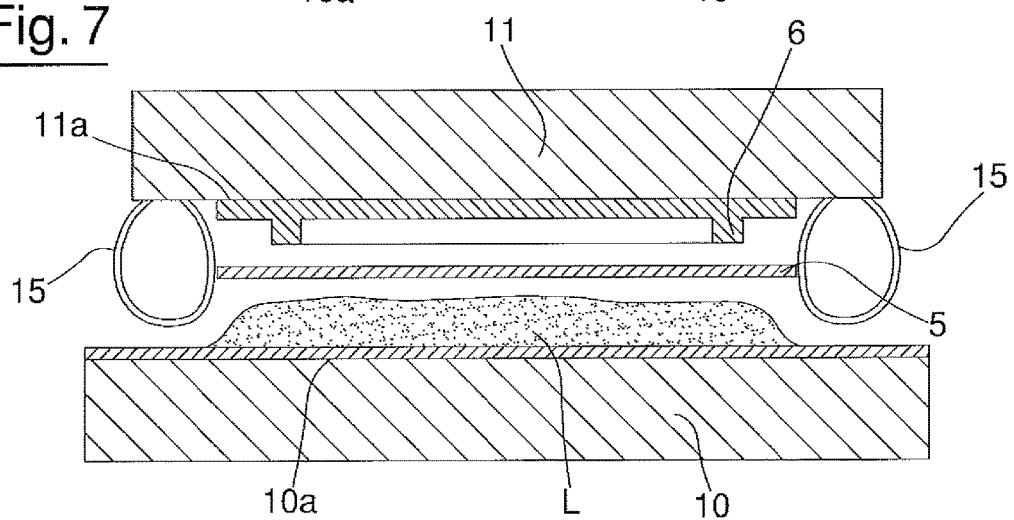
Figure 8:
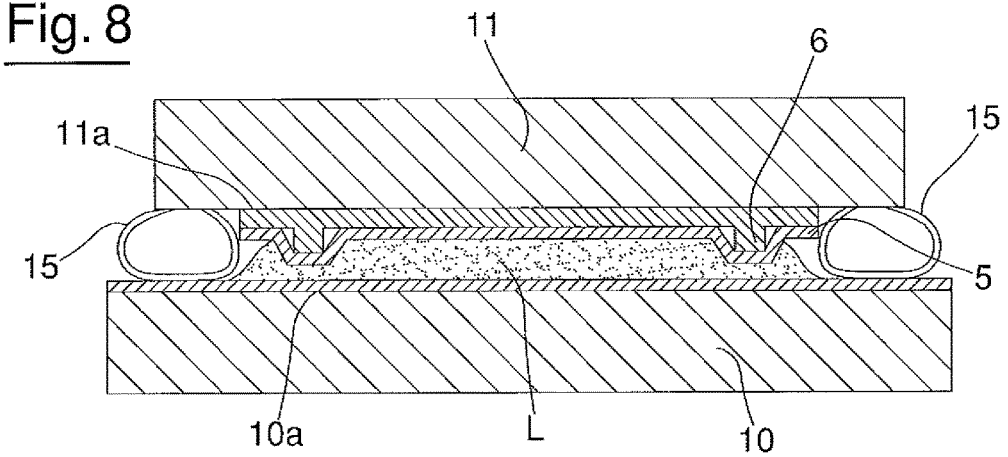

In a further possible embodiment, illustrated in FIGS. 6, 7 and 8, the side barriers (13,14,15) comprise a pair of upper elements (15), associated with the upper presser (11) and overall oriented in a direction parallel to the forward direction (Y). The upper elements (15) project downwards from the upper presser (11), to the sides of the pressing space (V). The upper elements are therefore interposed between the upper presser (11) and the active portion (5) of the upper belt (4).

The upper elements (15) may be structured to assume an inactive configuration, wherein they have a lower volume, and an active configuration, wherein they have a larger volume. For example, the upper elements (15) are inflatable in order to assume the active configuration. The upper elements (15) are preferably positioned so as not to interfere with the upper belt (4), which remains free to slide during the feeding of the load (L). For example, the upper elements (15) may be positioned to the sides of the active portion (5) of the upper belt (4). The upper elements (15) may be kept in the inactive configuration during the feeding of the load (L) to the pressing space (V), as shown in FIG. 6, and be brought into the active configuration before the actual pressing step, as shown in FIG. 7. This allows the pressers (10,11) to be kept very close together in the steps of introducing the load (L), therefore allowing a reduction in the time needed for the pressing stroke of the pressers themselves. During the pressing step, illustrated in FIG. 8, the upper elements (14) are compressed and deformed, maintaining a delimitation or lateral closure of the pressing space (V).

The upper elements (15) may be associated directly with the upper presser (11), or by means of additional supports known to a person skilled in the art.

The pressing device according to the present invention achieves important advantages.

The use of side barriers (13,14,15) prevents parts or particles of the load (L), even in the case of a thick load (L), escaping from the pressing space (V), becoming deposited in undesired areas of the machine. In particular, the side barriers prevent parts of the load (L) being able to fall to the side of the active portion (3) of the lower belt (2). Furthermore, the side barriers do not interfere with the pressing of the load (L).

The side barriers along the whole length of the movable belt also have the advantage of preventing parts or particles of the load (L) escaping along the whole of the pressing line.

The invention claimed is:

1. A pressing device for pressing ceramic particles into a ceramic item, the pressing device comprising:
   a lower presser (10), provided with a pressing surface (10a) facing upwards;
   an upper presser (11), provided with a pressing surface (11a) facing downwards; at least one of the two pressers is movable towards and away relative to the other in order to perform pressing of a layer (L) of ceramic particles;
   a pressing space (V), which is delimited inferiorly and superiorly by the lower presser (10) and the upper presser (11);

a lower belt (2), movable along a forward direction (Y) and comprising an active portion (3) which is disposed at least partially between the upper presser (11) and the lower presser (10);

an upper belt (4), movable along the forward direction (Y) and comprising an active portion (5), which is disposed at least partially between the lower belt (2) and the upper presser (11); wherein the pressing device is configured to regularly cycle between a closed position and an open position; in the closed position one or both of the two pressers are moved towards the other so that a portion of the layer (L) of ceramic particles is pressed between (a) the active portion (5) of the upper belt (4) and (b) the active portion (3) of the lower belt (2); in the open position one or both of the two pressers are moved away from the other so that the layer (L) of ceramic particles can be borne by the active portion (3) of the lower belt (2) and carried in the forward direction; wherein the pressing device comprises side barriers (13,14,15) which are arranged so that the layer (L) is laterally sealed between the active portion (3) of the lower belt (2) and the active portion (5) of the upper belt (4) within the pressing space (V) in the closed position but not in the open position.

2. A pressing device according to claim 1, wherein the side barriers (13,14,15) comprise a pair of lower elements (13), which are solidly constrained with the lower belt (2) and overall oriented in a direction parallel to the forward direction (Y).

3. A pressing device according to claim 2, wherein the lower elements (13) comprise an envelope (13*a*), which is associated with the lower belt (2) and an inner body (13*b*) contained within the envelope (13*a*).

4. A pressing device according to claim 2, comprising two stacks (11*b*) aligned with a respective lower element (13) on a vertical plane.

5. A pressing device according to claim 1, wherein the side barriers (13,14,15) comprise a pair of upper elements (14) being solidly constrained with the upper presser (11) and overall oriented in a direction parallel to the forward direction (Y).

6. A pressing device according to claim 5, wherein the upper elements (14) comprise an envelope (14*a*), which is solidly constrained with the upper presser (11) and an inner body (14*b*) contained within the envelope (14*a*).

7. A pressing device according to claim 1, wherein the side barriers (13,14,15) comprise a pair of upper elements (15) which are so structured as to take on an inactive configuration, wherein they exhibit a lower volume which is lower than a reference volume, and an active configuration, wherein they exhibit a greater volume which is greater than said reference volume.

8. A pressing device according to claim 7, wherein the upper elements (15) are inflatable in order to assume the active configuration.

9. A pressing device according to claim 1, wherein the side barriers (13,14,15) are so structured as to take on an inactive configuration, in which they exhibit a lower volume which is lower than a reference volume, and an active configuration, in which they exhibit a greater volume which is greater than said reference volume.

10. A pressing device according to claim 9, wherein the side barriers (13,14,15) are inflatable in order to take on the active configuration.

11. A pressing device according to claim 1, wherein the side barriers (13,14,15) are located within an area of the pressers (10,11) inside which the pressers are able to exert pressure.

\* \* \* \* \*